J. F. TOOMEY.
MEANS FOR CONTROLLING REPEATERS.
APPLICATION FILED OCT. 19, 1918.

1,364,964.

Patented Jan. 11, 1921.
6 SHEETS—SHEET 1.

Fig. 1

INVENTOR.
J. F. Toomey
BY G. E. Folk
ATTORNEY.

J. F. TOOMEY.
MEANS FOR CONTROLLING REPEATERS.
APPLICATION FILED OCT. 19, 1918.

1,364,964.

Patented Jan. 11, 1921.
6 SHEETS—SHEET 5.

Fig. 5

INVENTOR.
J. F. Toomey
BY G. E. Folk,
ATTORNEY.

J. F. TOOMEY.
MEANS FOR CONTROLLING REPEATERS.
APPLICATION FILED OCT. 19, 1918.

1,364,964.

Patented Jan. 11, 1921.
6 SHEETS—SHEET 6.

Fig. 6

INVENTOR.
J. F. Toomey
BY G. E. Folk,
ATTORNEY

UNITED STATES PATENT OFFICE.

JOHN F. TOOMEY, OF NEW YORK, N. Y., ASSIGNOR TO AMERICAN TELEPHONE AND TELEGRAPH COMPANY, A CORPORATION OF NEW YORK.

MEANS FOR CONTROLLING REPEATERS.

1,364,964.            Specification of Letters Patent.     Patented Jan. 11, 1921.

Application filed October 19, 1918. Serial No. 258,782.

*To all whom it may concern:*

Be it known that I, JOHN F. TOOMEY, residing at New York, in the county of New York and State of New York, have invented certain Improvements in Means for Controlling Repeaters, of which the following is a specification.

This invention relates to transmisson lines, and more particularly to means for controlling the operation of repeater elements included therein.

It is one of the objects of the invention to provide at a station or stations at which a transmission line terminates a means for controlling the operation of repeater elements located at another station or at other stations in the line, both when such stations are equipped with telegraph apparatus and when they are not. A further object consists in the provision of means for utilizing for telegraphic purposes the circuits provided for controlling the operation of distant repeater elements. Other and further objects of the invention will be clear from the detailed description to be given later.

In practice the usual type of vacuum tube repeater may be cut in or out of service with a transmission line by the opening or closing of the circuit including the filament thereof. When the mechanical type of repeater is employed its operation may be controlled by the opening or closing of a controlling circuit associated therewith. Accordingly it is customary to provide at a station including repeater elements suitable switching means for governing the filament or controlling circuits thereof, so that the repeaters may only be operatively associated with the transmission line when desired. At times, however, it may be found desirable to transfer the control over the repeater elements from the station at which they are located to a distant station, such as one of the stations at which the transmission line terminates. It is for this purpose that the arrangements embodying this invention have been provided.

In the arrangements of this invention there are provided between one or both terminal stations of the transmission lines and the repeater stations signaling circuits. By the use of suitable switching means at the terminal stations and at the repeater stations, these signaling circuits may be operated to control relay means in the repeater station or stations which will serve to open or to close the filament or control circuits of the repeater elements. By other operations of the same switching means the signaling circuits may be used for telegraphic purposes either between two terminal stations and around the repeater station, or between the repeater station and the terminal stations. Relay means are provided at the terminal stations whereby, when a telephone connection is made with the line at such a station, the signaling circuit will operate to automatically actuate means at the repeater station for governing the filament or control circuit.

The invention may now be more fully understood with reference to the accompanying drawings in the Figures 1, 2, 3, and 4 of which and the Figs. 5 and 6 when taken together are illustrated diagrammatically five different forms of the circuit arrangements of the invention.

Figure 1:
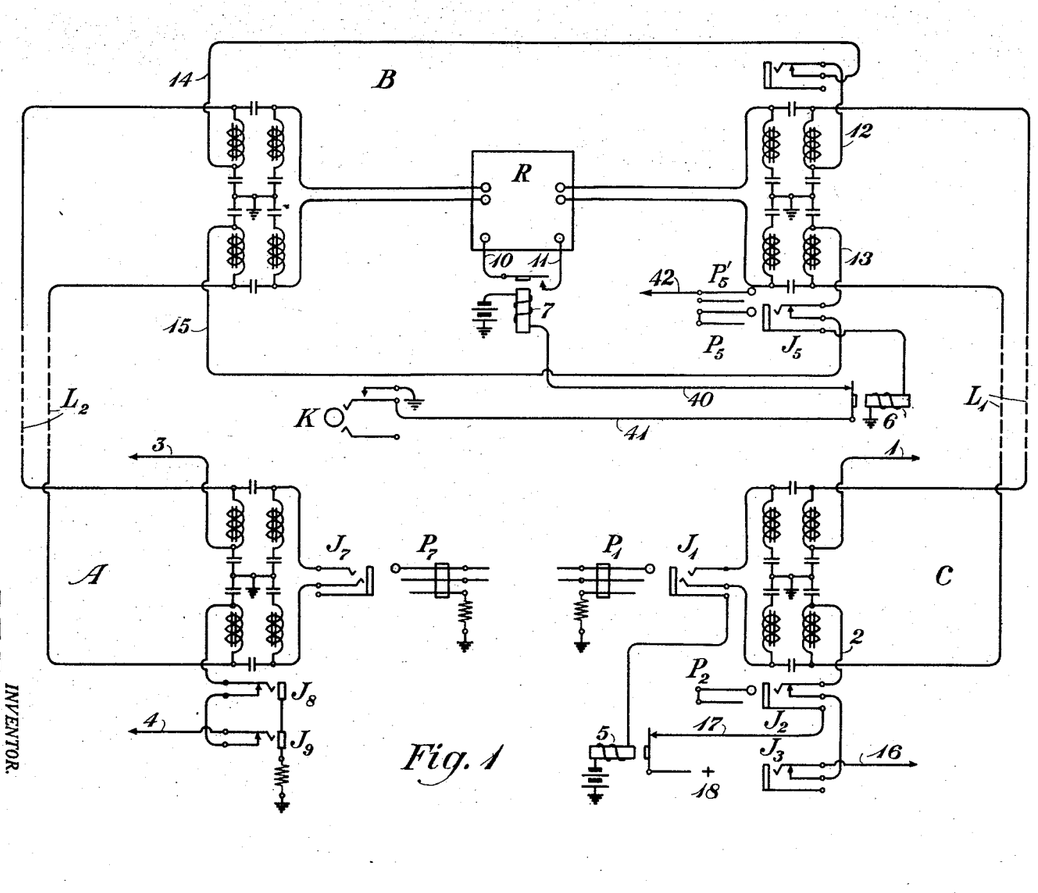

In the form of this invention, illustrated in Fig. 1, are shown two terminal stations A and C, connected by means of the transmission lines $L_2$ and $L_1$ with the station B. As it may be desirable to use the transmission lines $L_1$ and $L_2$ for both telephone and telegraph purposes, the conductors 12 and 13, and 14 and 15 are shown at the station B, associated with the transmission lines $L_1$ and $L_2$, and the conductors 1 and 2, and 3 and 4 are shown at the stations C and A associated with the transmission lines $L_1$ and $L_2$. The telegraph conductors 1, 2, 3, 4, 12, 13, 14 and 15 are associated with the transmission lines through impedance coils adapted to prevent the passage of telephone currents. Any telephone currents which may pass these impedance coils are shunted to ground through associated condensers which are opaque to telegraph currents. Other condensers are inserted in the line to prevent the passage of telegraph currents to the telephone apparatus, but readily allow the flow of telephone currents. Any telegraph impulses which pass through these last mentioned condensers are shunted to ground through associated circuits containing inductances and capacities similar to those first mentioned. In the Fig. 1 the telegraph conductors 12, 13, 14 and 15 are composited about the apparatus in station B. However, in other forms of the invention these conductors may lead to local telegraph equipment as hereinafter described. At the station B is repeater R adapted to connect the sections $L_1$ and $L_2$ of the transmission lines. This repeater may be of either the through line or cord circuit type but as illustrated in Fig. 1 it is of the former type. The through line repeater R is shown in the conventional manner and includes the usual repeater elements. The repeater elements may be either of the vacuum tube or mechanical type. Associated with the repeater elements is a circuit including the conductors 10 and 11, which, if vacuum tube repeaters are used, may serve to control the supply of current to the filaments thereof, and if mechanical repeaters are employed may serve to control the battery supply therefor, and thus control the operation of the repeater elements. The circuit including the conductors 10 and 11 is controlled by the relay 7 which in turn may be controlled by the repeater cut out key K, or by other suitable means at repeater station B. Included in the conductors 13 and 15 is the jack $J_5$ and an idle plug $P_5$. Connected to the sleeve contact of the jack $J_5$ is the relay 6, which may also control the operation of the relay 7. The line at station C terminates in the jack $J_1$. In the telegraph conductor 2 are shown the jacks $J_2$ and $J_3$ and an idle plug $P_2$ adapted to co-act therewith. Connected to the sleeve contact of the jack $J_2$ by means of the conductor 17, is a source of electrical energy 18. The connection of this source to the conductor 17 is controlled by the relay 5, which is connected to the sleeve contact of the jack $J_1$. Adapted to co-act with the jack $J_1$ is the plug $P_1$ of an adjoining cord circuit which serves to connect the line at station C with a subscriber's station or with another line. The insertion of the plug $P_1$ in the jack $J_1$ serves to control the operation of the relay 5.

As the arrangements shown in the Figs. 2, 3, 4, 5 and 6 are in general the same as those illustrated in Fig. 1, no further description thereof will be given, and the distinctions therein may be observed in the following description of the operation of the arrangements of the invention.

The operation of the arrangements of the invention as illustrated in Fig. 1 is as follows: If it is desired to transfer the control over the repeater elements at the station B from the station B to the station C, the operator at station B inserts the plug $P_5$ into the jack $J_5$ and the operator at station C inserts the plug $P_2$ into the jack $J_2$. When the plug $P_5$ is inserted in the jack $J_5$, and the plug $P_2$ is inserted in the jack $J_2$, the following circuit is closed:—from the source of electrical energy 18, armature and contact of relay 5, conductor 17, sleeve contacts of jack $J_2$ and plug $P_2$, tip contacts of plug $P_2$ and jack $J_2$, over conductor 2, transmission line $L_1$, conductor 13, tip contacts of jack $J_5$ and plug $P_5$, sleeve contacts of plug $P_5$ and jack $J_5$, winding of relay 6 to ground. The closing of the above described circuit will energize the relay 6. The relay 6 is controlled at the station C as follows:— If a telephone connection is made with the line at station C by inserting the plug $P_1$ in the jack $J_1$, the following circuit is closed: from ground, sleeve contacts of plug $P_1$ and jack $J_1$, conductor leading to relay 5, winding of relay 5, to battery and ground. The closing of the above described circuit will energize relay 5 which will pull up its armature and disconnect the source of electrical energy 18 from the conductor 17, thus opening the circuit formerly closed through relay 6. By the above described means it will be seen that the relay 6 may be controlled by the insertion in or removal from the jack $J_1$ of the plug $P_1$. Normally the repeater elements are controlled at station B by the operation of the key K which closes a circuit from ground, through the contact of key K, conductor 41, contact of relay 6, conductor 40, winding of relay 7 to battery and ground. This energizes relay 7 thus closing the circuit through conductors 10 and 11. As has been formerly pointed out the closing of this last mentioned circuit cuts the repeater elements into service. If the key K remains thrown and the plugs $P_2$ and $P_5$ are inserted in the jacks $J_2$ and $J_5$ respectively, it will be seen that the previously described circuit including the relay 7 will be under the control of the relay 6. The relay 6 as has been formerly pointed out is controlled at the station C. Accordingly the above described arrangements afford a means for controlling the repeater elements at station B from station C as well as locally at station B. If it is desired to have telegraph service between the stations C and A, the idle plugs $P_2$ and $P_5$ are removed from the jacks $J_2$ and $J_5$, respectively, and the telegraph circuit is completed as follows:—from conductor 16 leading to the telegraph apparatus, contacts of jacks $J_3$ and $J_2$, conductor 2, transmission line $L_1$, conductor 13, contacts of jack $J_5$, conductor 15, transmission line $L_2$ and over conductor 4 to the telegraph apparatus at station A. If it is desired to operate telegraph apparatus between stations B and C plug $P_5'$ may be inserted in jack $J_5$, so that the telegraph channel as previously described to jack $J_5$ and thence over plug $P_5'$ and conductor 42 to the telegraph apparatus at station B may be used. It will also be noted that by means of a cord and plugs the telegraph apparatus associated with conductor 16 at station C may be picked up at jack $J_8$ and used on another line if desired while the repeater control circuit with which it is normally associated is in use.

Figure 2:
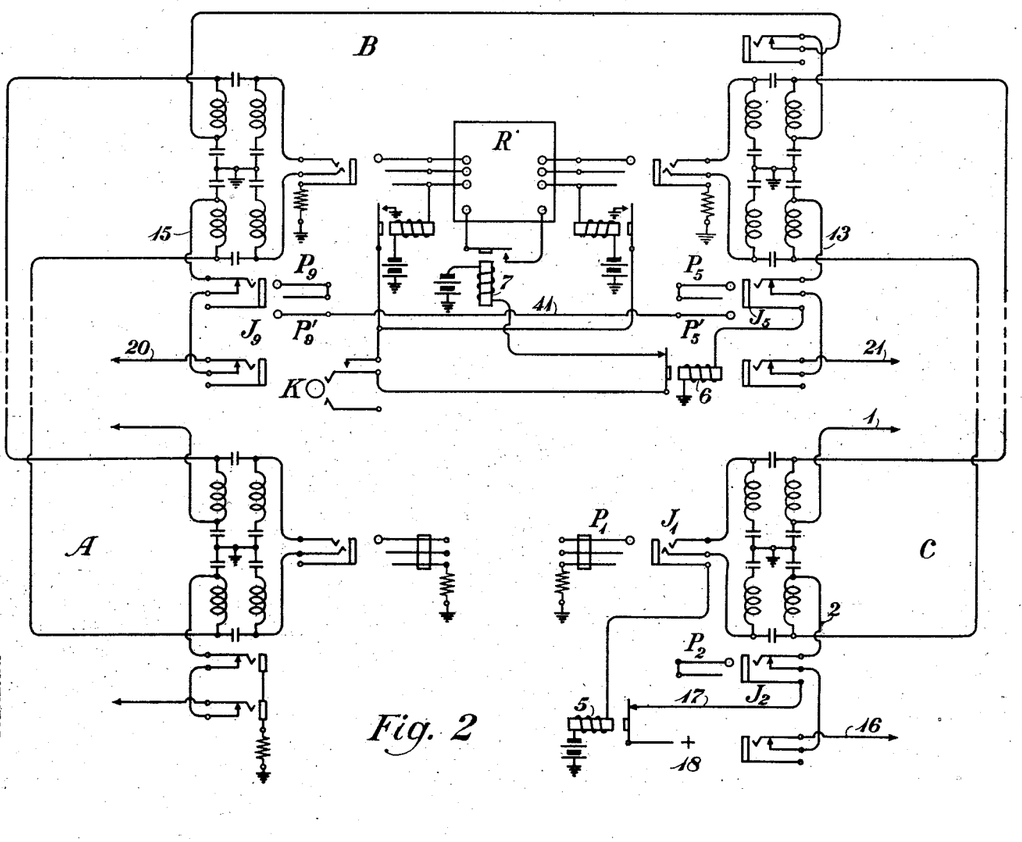

In the form of the invention illustrated in Fig. 2, the telegraph conductors 13 and 15 at the station B are not arranged so that through telegraph service will be had between stations A and C, but are connected to conductors 20 and 21 leading to telegraph apparatus at the station B. By this arrangement telegraph service may be had between stations A and B and between stations B and C. Through telegraph service may be obtained between station A and station C by inserting plug $P_5'$ in jack $J_5$ and inserting plug $P_9'$ in jack $J_9$. If it is desired with the above described arrangements to transfer the control over the repeater elements at station B from the station B to the station C, the key K is thrown and the idle plugs $P_5$ and $P_2$ are inserted in the jacks $J_5$ and $J_2$ respectively. In a manner similar to that described for the arrangements shown in Fig. 1, the operation of these switching means will close the circuit through the relay 6, which will in turn control the operation of the relay 7 and thereby control the operation of the repeater elements. The repeater R as shown in this figure is of the cord circuit type but it will be understood that in all of the figures it is immaterial so far as the invention is concerned whether the repeater be of the through line or cord circuit type.

Figure 3:
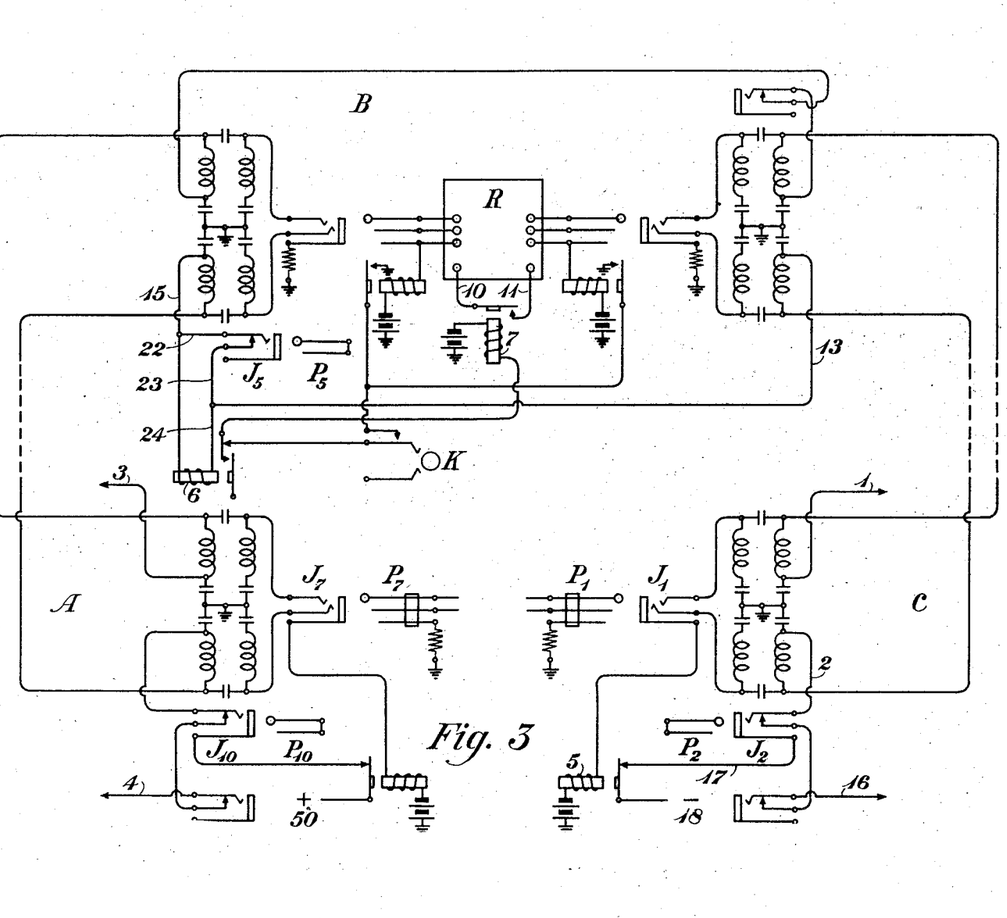

In the form of the invention illustrated in Fig. 3, the repeater elements at station B may be controlled either at station A or at station C. The arrangements at the terminal stations A and C are identical and are similar to the station C illustrated in Fig. 1 except that the sources of electrical energy 18 and 50 are of different polarity. At the station B the telegraph conductors 13 and 15 are directly connected to the relay 6. A short circuit about the winding of the relay 6 is provided by the conductors 22 and 23 and the contacts of the jack $J_5$. Through telegraph service may take place between the stations A and C, illustrated in this figure, by means of the above mentioned short circuit, without interfering with the operation of the repeater elements. If it is desired to transfer the control over the repeater elements at station B from station B, either to the station A or to the station C, the key K is thrown and the plug $P_5$ is inserted in the jack $J_5$. The insertion of the idle plug $P_5$ into the jack $J_5$ serves to open the above mentioned short circuit, and includes in the telegraph circuit the winding of the relay 6. The relay 6 accordingly will become energized when the idle plugs $P_2$ and $P_{10}$ at the stations C and A, respectively, are inserted in the jacks $J_2$ and $J_{10}$. Relay 6 will be controlled in the same manner as in Fig. 1, whenever a telephone connection is made with either the station C or the station A at the jacks $J_1$ or $J_7$. The operation of the relay 6 controls the operation of the repeater elements at station B in the same manner as pointed out in Fig. 1.

Figure 4:
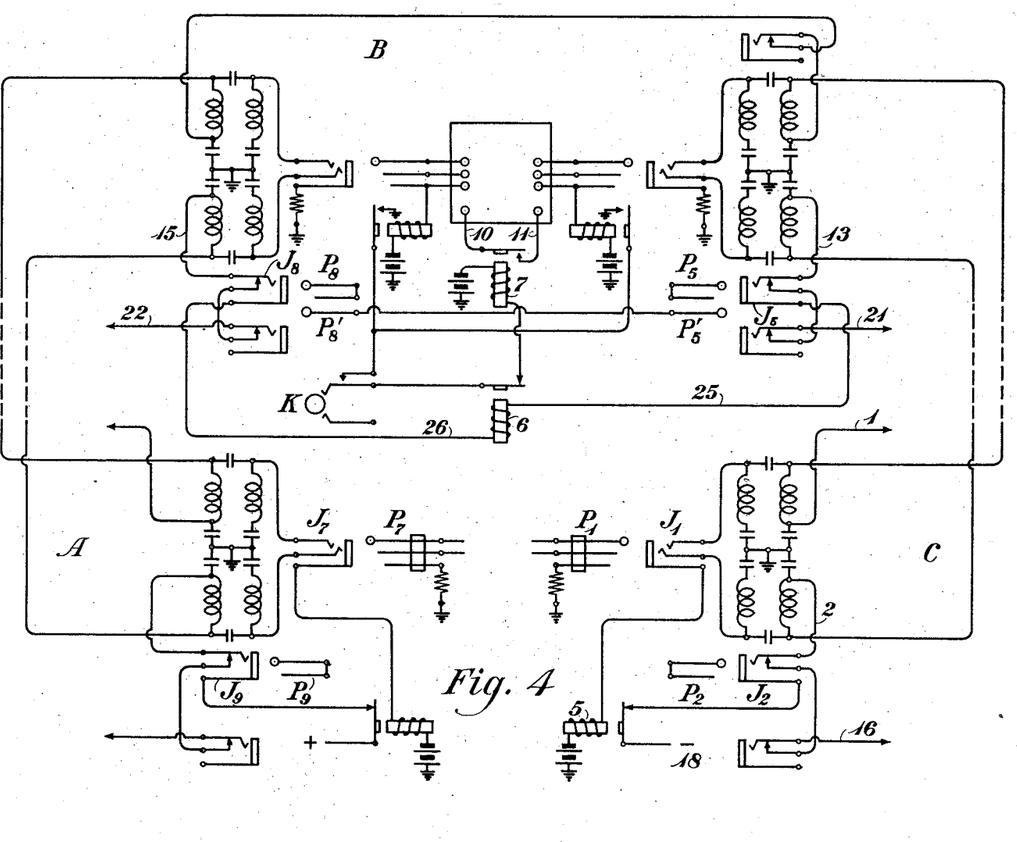

In the form of the invention illustrated in Fig. 4, the repeater elements at station B may be controlled either at the station A or at the station C. The stations A and C are similar to those illustrated and described in connection with Fig. 3. Telegraph conductors 13 and 15 at the station B are connected to conductors 21 and 22 leading to telegraph apparatus at the station B, and telegraph service may be had between stations A and B and between stations B and C, with the arrangement as shown. Through telegraph service between stations A and C may be had by inserting plug $P_5'$ in jack $J_5$ and plug $P_8'$ in jack $J_8$. To transfer the control over the repeater elements at station B from the station B, either to the station A or to the station C, the idle plugs $P_8$ and $P_5$ are inserted in the jacks $J_8$ and $J_5$, respectively, and the plugs $P_2$ and $P_9$ are inserted in the jacks $J_2$ and $J_9$ and the key K is thrown. The relay 6 will then serve to control the operation of the repeater elements in the same manner as previously pointed out.

Figure 5:
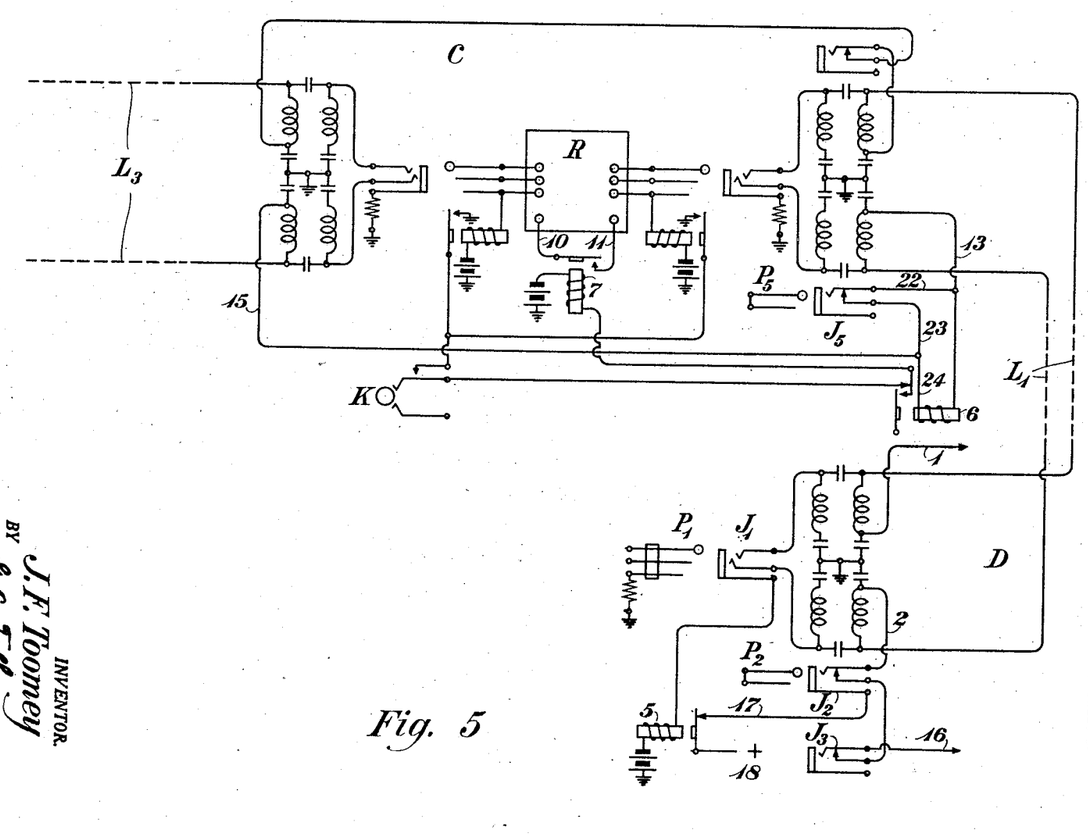
Figure 6:
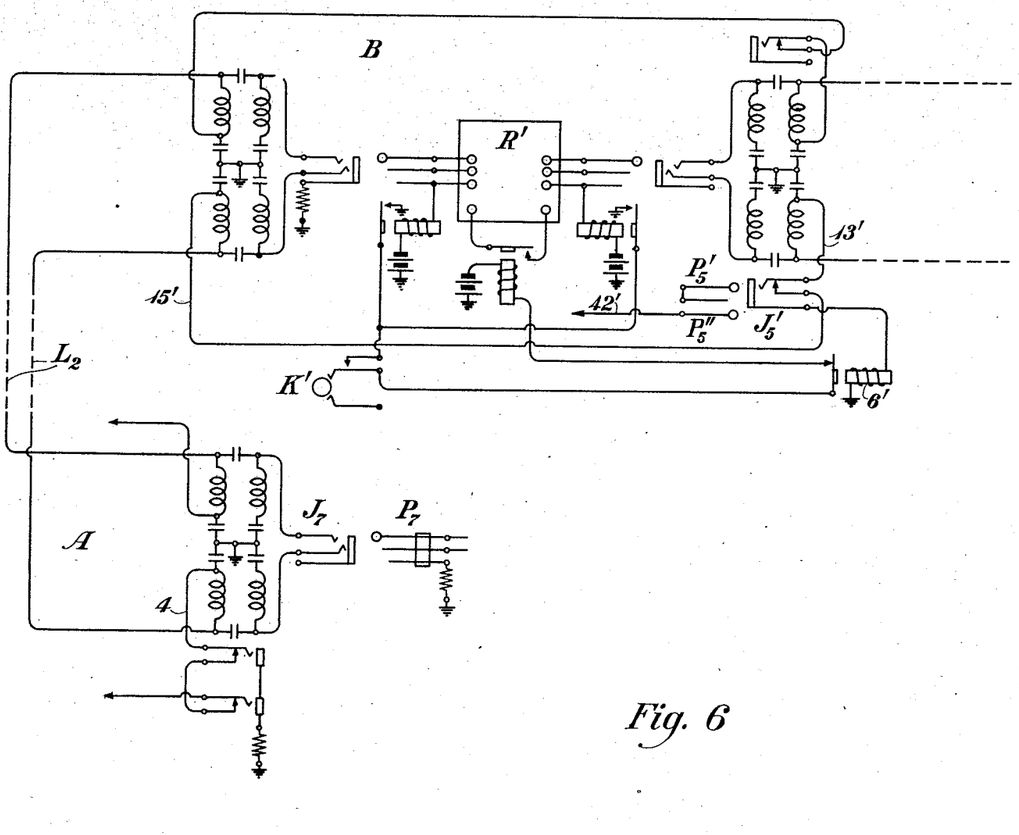

In the Figs. 5 and 6, when taken together, are shown two repeater stations B and C, connected in tandem. If it is desired to transfer the control over the repeater elements in both of these stations from these stations to the station D, the keys K and K' are thrown and the plugs $P_5$ and $P_5'$ are inserted in the jacks $J_5$ and $J_5'$, respectively. The plug $P_2$ is inserted in the jack $J_2$ at station D. This will complete the following circuit:—from source of electrical energy 18, over the armature and contact of relay 5, conductor 17, sleeve contacts of jack $J_2$ and plug $P_2$, tip contacts of plug $P_2$ and jack $J_2$, conductor 2, transmission line $L_1$, conductor 13, winding of relay 6, conductors 24 and 15, transmission line $L_3$, conductor 13', tip contacts of jack $J_5'$ and plug $P_5'$, sleeve contacts of plug $P_5'$ and jack $J_5'$, winding of relay 6' to ground. The closing of the above described circuit will energize the controlling relays 6 and 6' which, in the manner previously pointed out, will control the operation of the repeater elements at the stations B and C. When the idle plugs $P_5'$, $P_5$, and $P_2$ are removed from their respective jacks; through telegraph service between stations D and A will take place over the following circuit:—from conductor 16 leading to telegraph apparatus at station D, contacts of jacks $J_3$ and $J_2$, conductor 2, transmission line $L_1$, conductors 13 and 22, contacts of jack $J_5$, conductors 23 and 15, transmission line $L_3$ conductor 13', contacts of jack $J_5'$ conductor 15', transmission line $L_2$ over conductor 4 leading to telegraph equipment at station A. Through telegraph service between B and D may be had by inserting the plug $P_5''$ in the jack $J_5'$ in a manner analogous to that already described.

While the invention has been illustrated as embodied in certain specific arrangements which have been deemed desirable, it will be understood that it is capable of embodiment in many and widely varied arrangements without departing from the spirit of the invention as defined in the appended claims.

What is claimed is:

1. In a transmission system, a station including telephone repeater elements, a transmission circuit including a pair of conductors associated with said station and terminating at a distant station, means to complete a telephone circuit over said conductors and through said repeater station, telegraph signaling apparatus at said stations whereby a telegraph signaling circuit may be extended over one of said conductors, and means whereby said repeater elements may be controlled over said telegraph signaling circuit.

2. In a transmission system, a station including telephone repeater elements, a transmission circuit including a pair of conductors associated with said station and terminating at a distant station, means to complete a telephone circuit over said conductors and through said repeater station, telegraph signaling apparatus at said stations whereby a telegraph signaling circuit may be extended over one of said conductors, means at said repeater stations for controlling said repeater elements, and switching means at said repeater stations for associating said controlling means with said telegraph signaling circuit.

3. In a transmission system, a station including telephone repeater elements, a transmission circuit including a pair of conductors associated with said station and terminating at a distant station, means to complete a telephone circuit over said conductors and through said repeater station, telegraph signaling apparatus at said stations whereby a telegraph signaling circuit may be extended over one of said conductors, means at said repeater stations for controlling said repeater elements, switching means at said repeater stations for associating said controlling means with said telegraph signaling circuit, and means at said distant station for controlling said telegraph signaling circuit.

4. In a transmission system, a station including telephone repeater elements, a transmission circuit including a pair of conductors associated with said station and terminating at a distant station, means to complete a telephone circuit over said conductors and through said repeater station, telegraph signaling apparatus at said stations whereby a telegraph signaling circuit may be extended over one of said conductors, means at said repeater stations for controlling said repeater elements, switching means at said repeater station for associating said controlling means with said telegraph signaling circuit, a source of electrical energy at said distant station, means to connect said source to said telegraph signaling circuit, and means at said distant station for controlling said telegraph signaling circuit.

5. In a transmission system, a station including telephone repeater elements, transmission circuits each including a pair of conductors associated with said station and terminating at distant stations, means to complete a telephone circuit over said conductors and through said repeater station, telegraph signaling apparatus at said stations whereby a telegraph signaling circuit may be extended over one of the conductors of each of said transmission circuits, and means whereby said repeater elements may be controlled from one of said distant stations over one of said telegraph circuits.

6. In a transmission system, a plurality of stations including telephone repeater elements, a transmission circuit including a pair of conductors for connecting said stations, a transmission circuit including a pair of conductors for connecting one of said repeater stations with a distant station, means to complete a telephone circuit over both of the conductors of each of said transmission circuits and through said repeater stations, telegraph signaling apparatus at said stations whereby a telegraph signaling circuit may be extended over one of the conductors of each of said transmission circuits, and means whereby said repeater elements may be controlled from said distant station over said telegraph signaling circuit.

7. In a transmission system, a station including telephone repeater elements, transmission lines associated with said station and terminating at distant stations, signaling circuits associated with said transmission lines at said stations, a relay at said repeater station for controlling said repeater elements, switching means at said repeater stations and at one of said terminal stations for including said relay in one of said signaling circuits, and means at said terminal station for controlling said signaling circuit.

8. In a signaling system, a plurality of stations, a repeater at one station, a control circuit for said repeater extending from said station to a distant station whereby said repeater may be rendered operative or inoperative at will from the distant station, and means whereby when said control circuit becomes opened said repeater is rendered operative.

In testimony whereof, I have signed my name to this specification this 15th day of October 1918.

JOHN F. TOOMEY.